(12) United States Patent
Nagashima et al.

(10) Patent No.: US 11,981,202 B2
(45) Date of Patent: May 14, 2024

(54) ACCELERATOR PEDAL DEVICE

(71) Applicant: MIKUNI CORPORATION, Tokyo (JP)

(72) Inventors: Jun Nagashima, Kanagawa (JP); Satoshi Miyazaki, Kanagawa (JP); Takahiro Urano, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 239 days.

(21) Appl. No.: 17/603,001

(22) PCT Filed: Feb. 29, 2020

(86) PCT No.: PCT/JP2020/008562
§ 371 (c)(1),
(2) Date: Oct. 11, 2021

(87) PCT Pub. No.: WO2020/250505
PCT Pub. Date: Dec. 17, 2020

(65) Prior Publication Data
US 2022/0118849 A1    Apr. 21, 2022

(30) Foreign Application Priority Data

Jun. 12, 2019    (JP) .................................. 2019-109398

(51) Int. Cl.
*B60K 26/02* (2006.01)
*G05G 1/30* (2008.04)
(Continued)

(52) U.S. Cl.
CPC ............... *B60K 26/02* (2013.01); *G05G 1/44* (2013.01); *B60Y 2410/10* (2013.01); *G05G 5/04* (2013.01)

(58) Field of Classification Search
CPC .................. B60K 26/02; B60K 26/021; B60K 2026/023; B60K 2026/026; G05G 1/30; G05G 1/44; G05G 1/445; G05G 5/04
See application file for complete search history.

(56) References Cited

U.S. PATENT DOCUMENTS

| | | | |
|---|---|---|---|
| 8,806,977 B2 * | 8/2014 | Stewart | B60K 26/021 74/512 |
| 8,925,418 B2 * | 1/2015 | Saito | G05G 1/38 74/513 |

(Continued)

FOREIGN PATENT DOCUMENTS

| | | |
|---|---|---|
| CN | 102442213 | 5/2012 |
| CN | 202294299 | 7/2012 |

(Continued)

OTHER PUBLICATIONS

Machine translation of CN 202294299 U obtained on Aug. 1, 2023.*

(Continued)

*Primary Examiner* — Adam D Rogers
(74) *Attorney, Agent, or Firm* — JCIPRNET

(57) ABSTRACT

An accelerator pedal device according to the present invention is provided with: a pedal arm (30) having an accelerator pedal; a resin housing (10) for supporting the pedal arm such that the pedal arm is swivelable about a prescribed axial line (S) between a rest position and a maximum stepping position; and a return spring (40) that applies a biasing force for returning the pedal arm to the rest position. The housing includes: a boss section (11*i*) through which a bolt (B) for fixing the housing to a vehicle body is made to pass; and a full open stopper (11*n*) for specifying the maximum stepping position in the vicinity of the boss section.

10 Claims, 10 Drawing Sheets

(51) Int. Cl.
*G05G 1/44* (2008.04)
*G05G 5/04* (2006.01)

(56) References Cited

U.S. PATENT DOCUMENTS

| | | | | |
|---|---|---|---|---|
| 9,075,427 | B2* | 7/2015 | Muraji | B60K 26/021 |
| 9,244,481 | B2* | 1/2016 | Stewart | G05G 5/03 |
| 10,569,648 | B2* | 2/2020 | Saito | B60K 26/02 |
| 10,739,810 | B2* | 8/2020 | Nagashima | B60K 26/02 |
| 10,921,843 | B2* | 2/2021 | Nagashima | B60K 26/02 |

FOREIGN PATENT DOCUMENTS

| | | |
|---|---|---|
| CN | 203318169 | 12/2013 |
| JP | 2004108214 | 4/2004 |
| JP | 2012082725 | 4/2012 |
| JP | 2013147211 | 8/2013 |
| JP | 2013244842 | 12/2013 |
| JP | 2014528617 | 10/2014 |
| JP | 2016124447 | 7/2016 |
| JP | 2018103943 | 7/2018 |
| JP | 2018108803 A * | 7/2018 ............. B60K 26/02 |
| JP | 2018165891 | 10/2018 |
| WO | WO-2020250504 A1 * | 12/2020 |

OTHER PUBLICATIONS

Machine translation of JP 2018-108803 A obtained on Aug. 1, 2023.*

"International Search Report (Form PCT/ISA/210) of PCT/JP2020/008562," dated Apr. 14, 2020, with English translation thereof, pp. 1-6.

* cited by examiner

ACCELERATOR PEDAL DEVICE

CROSS-REFERENCE TO RELATED APPLICATION

This application is a 371 application of the International PCT application serial no. PCT/JP2020/008562, filed on Feb. 29, 2020, which claims the priority benefits of Japan Patent Application No. 2019-109398, filed on Jun. 12, 2019. The entirety of each of the above-mentioned patent applications is hereby incorporated by reference herein and made a part of this specification.

BACKGROUND OF THE INVENTION

Field of the Invention

The invention relates to an accelerator pedal device suitable for a vehicle, etc., and particularly relates to an accelerator pedal device including a housing formed by a resin material.

Description of Related Art

As a conventional accelerator pedal device, an accelerator pedal device including a resin housing, an accelerator pedal supported on the housing to be swivelable, and a spring returning the accelerator pedal to a full close position which is a rest position is known (see Patent Document 1, Patent Document 2, for example).

In the accelerator pedal device, the housing includes a bottom plate provided opposite to the vehicle body side, a top plate opposite to the bottom plate, and side plates on two sides. In addition, the bottom plate is provided with two mounting holes through which bolts for fixing the housing to the vehicle body pass, and a full open stopper provided at a position offset from the two mounting holes to stop the accelerator pedal at a full open position.

However, in such accelerator pedal device, since the full open stopper is offset from the mounting holes of the bolts, when the accelerator pedal is stepped on with an excessive stepping force to contact the full open stopper, a bending moment is generated in the housing with the region of the mounting holes fixed by the bolts as the fulcrum and the full open stopper as the load point. Due to the bending moment, there is a concern that the housing may be deformed or broken in the vicinity of the full open stopper or other vulnerable parts.

PRIOR ART DOCUMENT

Patent Document

Patent Document 1: Japanese Laid-open No. 2012-82725
Patent Document 2: Japanese Laid-open No. 2013-244842

SUMMARY OF THE INVENTION

Problem to be Solved by the Invention

The invention is made in view of the above, and the objective thereof is to provide an accelerator pedal device capable of preventing a housing from being deformed or broken even with application of an excessive stepping force while simplifying the structure as well as the shape and reducing the cost as well as the size.

Means for Solving the Problem

An accelerator pedal device according to the invention includes: a pedal arm, having an accelerator pedal; a resin housing, supporting the pedal arm to be swivelable about a predetermined axial line between a rest position and a maximum stepping position; and a return spring, applying an urging force which returns the pedal arm to a rest position. The housing includes a boss section through which a bolt for fixing the housing to a vehicle body passes and a full open stopper specifying the maximum stepping position in a vicinity of the boss section.

In the accelerator pedal device, it may also be configured that the boss section has a through hole extending in parallel with the axial line, and the full open stopper is formed at a position overlapping with the through hole in a direction of receiving a stepping force load of the pedal arm.

In the accelerator pedal device, it may also be configured that the boss section includes, on a periphery of the through hole, a plurality of thinned concave sections and a reinforcing rib interposed between the thinned concave sections to transmit the stepping force load applied to the full open stopper to the bolt passing through the boss section.

In the accelerator pedal device, it may also be configured that the full open stopper is formed within a range of a width dimension of the boss section.

In the accelerator pedal device, it may also be configured that the boss section is fit with a cylindrical metal collar for the bolt to pass through.

In the accelerator pedal device, it may also be configured that the pedal arm includes a cylindrical section supported on the housing, an upper side arm extending upward in a vertical direction from the cylindrical section, and a lower side arm extending downward in the vertical direction from the cylindrical section, and the lower side arm has a contact section forming a predetermined width in a direction of the axial line and contacting the full open stopper on a rear surface facing to the full open stopper.

In the accelerator pedal device, it may also be configured that the boss section includes a lower side boss section disposed below the axial line in a vertical direction and a plurality of upper side boss sections disposed above the axial line in the vertical direction, and the full open stopper is provided in a vicinity of the lower side boss section.

In the accelerator pedal device, it may also be configured that the housing includes a housing body defining an accommodation space accommodating a cylindrical section and an upper side arm of the pedal arm and a housing cover combined with the housing body to block the accommodation space, the boss section includes a body boss section provided in the housing body and a cover boss section provided in the housing cover, and the full open stopper is provided in a vicinity of the body boss section.

In the accelerator pedal device, it may also be configured that the housing is fixed with respect to the vehicle body via a bracket.

In the accelerator pedal device, it may also be configured that the bracket includes a housing fixing wall to which the housing is fixed and a vehicle body side fixing wall to be fixed to the vehicle body.

In the accelerator pedal device, it may also be configured that the boss section is formed to protrude in parallel with the axial line from an outer wall surface of the housing to contact the housing fixing wall.

Inventive Effects

According to the accelerator pedal device with the above configuration, an accelerator pedal device capable of preventing the housing from being deformed or broken even with application of an excessive stepping force, while simplifying the structure as well as the shape and reducing the cost as well as the size can be obtained.

DESCRIPTION OF THE EMBODIMENTS

Hereinafter, embodiments of the invention will be described with reference to the accompanying drawings.

Figure 1:
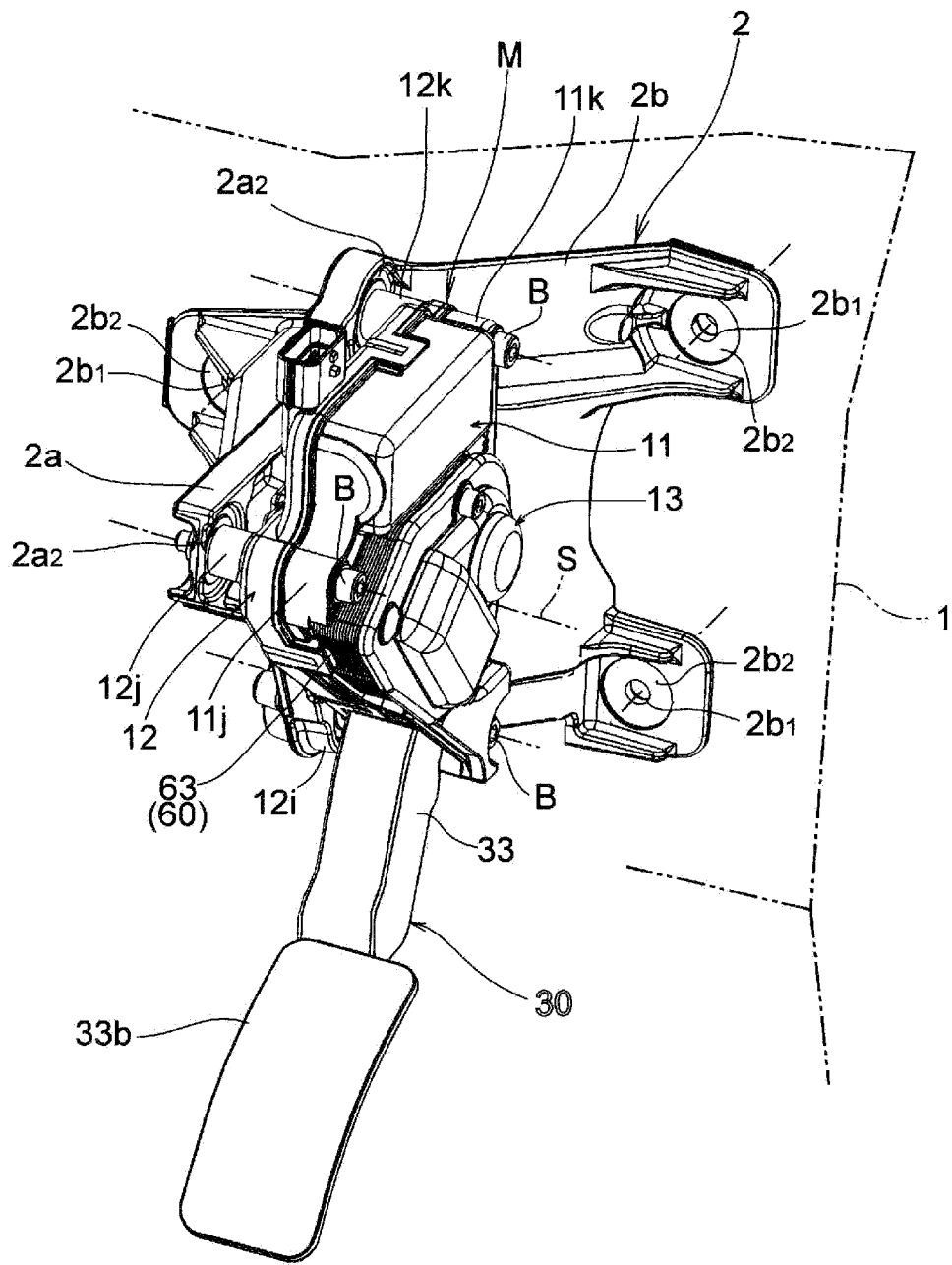
FIG. 1 is a perspective view illustrating a state in which an accelerator pedal device is fixed with respect to a dash lower penal of a vehicle body via a bracket according to an embodiment of the invention.
Figure 2:
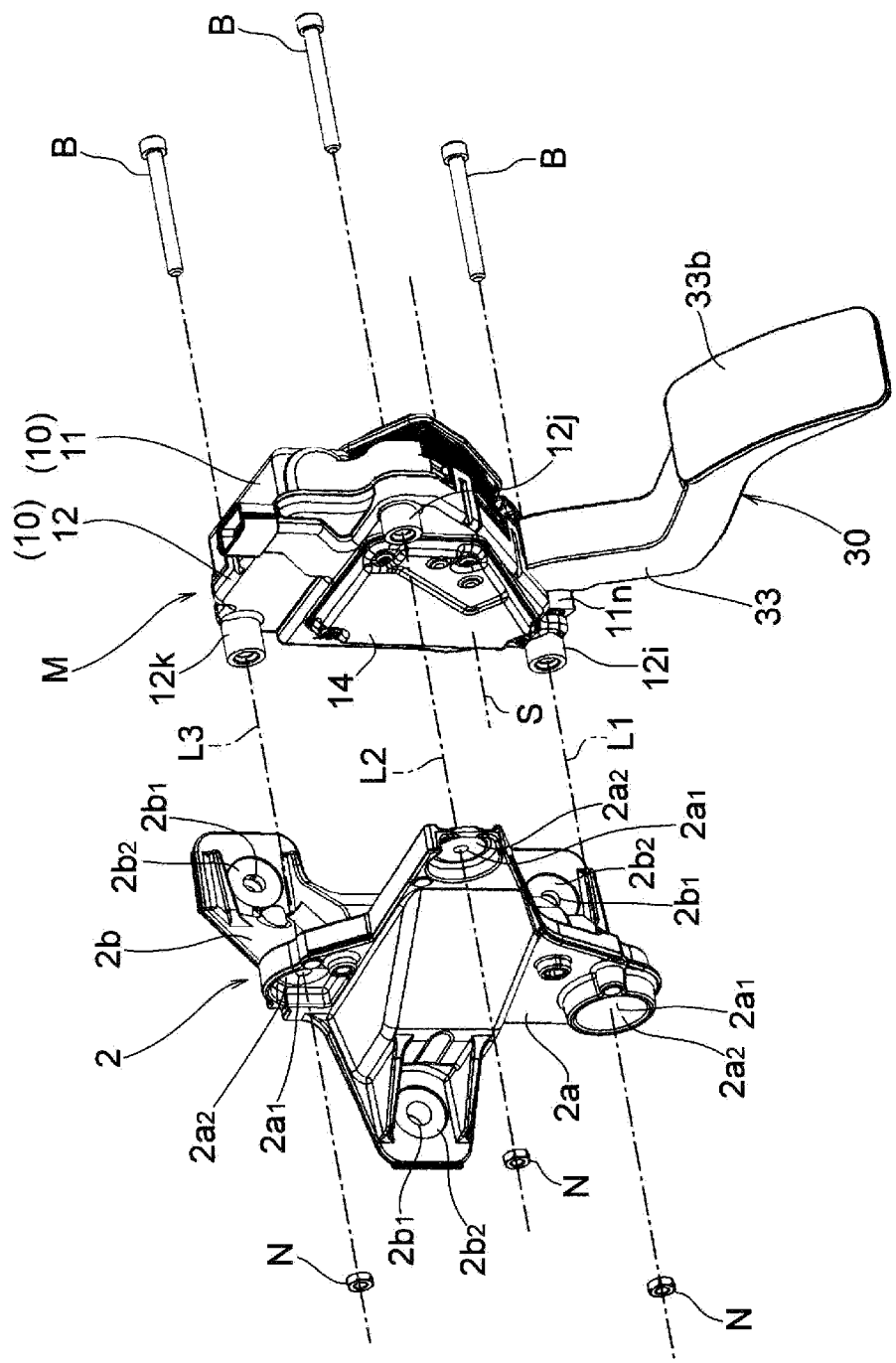
FIG. 2 is an exploded perspective view in which the accelerator pedal device and the bracket shown in FIG. 1 are separated.

As shown in FIGS. 1 and 2, an accelerator pedal device M according to an embodiment is fixed with respect to a dash lower panel 1 of the vehicle body via a bracket 2.

The bracket 2 is formed by a metal material and includes a housing fixing wall 2a to which a housing 10 of the accelerator pedal device M is fixed and a vehicle body side fixing wall 2b fixed to the dash lower panel 1 of the vehicle body.

The housing fixing wall 2a is formed to face the wall surface in the width direction of the vehicle body and is provided with three circular holes $2a_1$ through which bolts B fixing the housing 10 pass and three seat sections $2a_2$ which are flat and formed on the periphery of the circular holes $2a_1$.

The vehicle body side fixing wall 2b is formed along the dash lower panel 1 and is provided with three holes $2b1$ through which bolts (not shown) fixed to the vehicle body pass and three seat sections $2b2$ which are flat and formed on the periphery of the holes $2b1$.

As shown in FIGS. 1 to 8, the accelerator pedal device M includes a housing 10, cylindrical collars 20, a pedal arm 30, a return spring 40 returning the pedal arm 30 to a rest position, a hysteresis generation mechanism 50 generating hysteresis in a stepping force, a torque motor 60 and a lever 70 as a reaction force adding mechanism adding a reaction force to the pedal arm 30, a position sensor 80 detecting a rotational angle position of the pedal arm 30, and a circuit substrate 90.

The housing 10 is formed by a resin material and is configured by a housing body 11 and a housing cover 12 connected to the housing body 11.

In addition, the outer side of the housing body 11 is connected with a first auxiliary cover 13, and the outer side of the housing cover 12 is connected with the second auxiliary cover 14.

Figure 5:
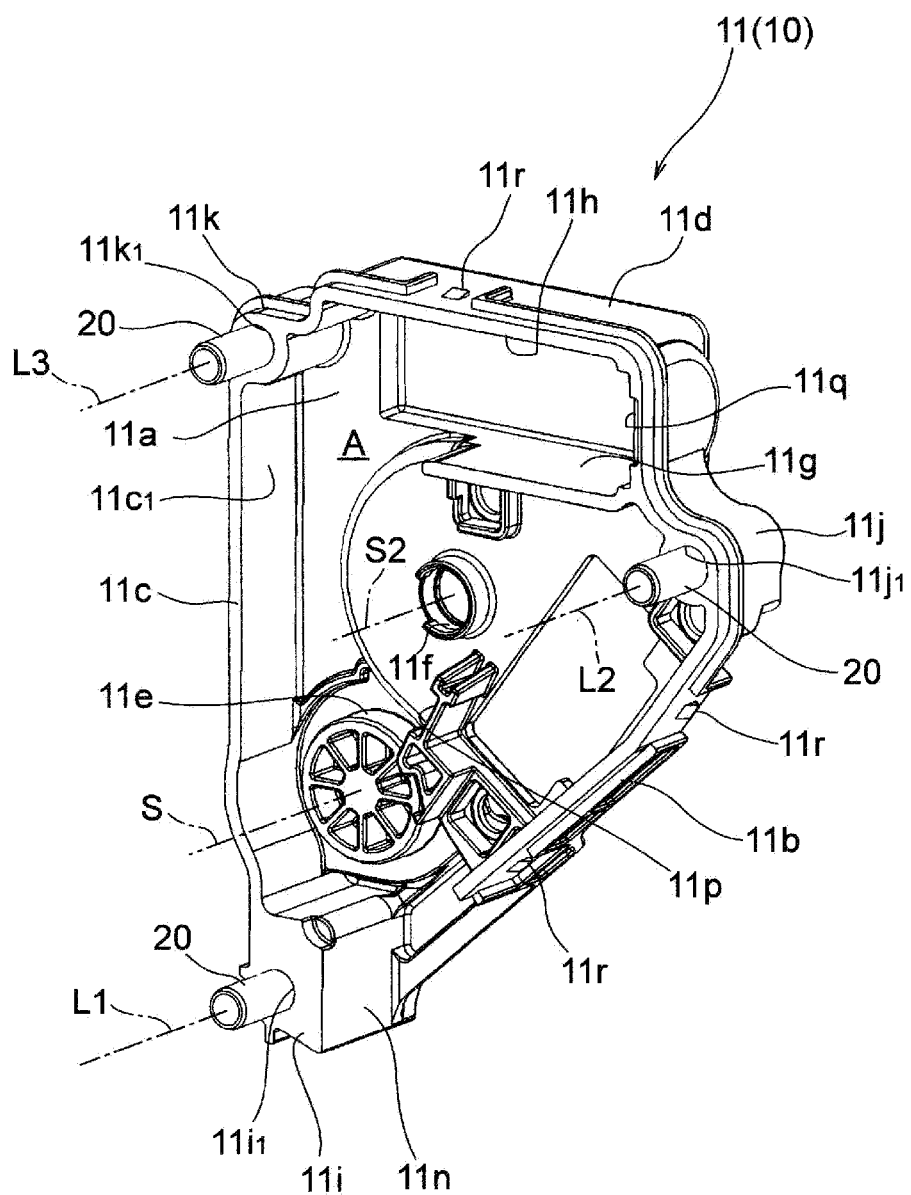
FIG. 5 is a perspective view illustrating the inner side of a housing body forming a portion of a housing included in the accelerator pedal device shown in FIG. 3.
Figure 6:
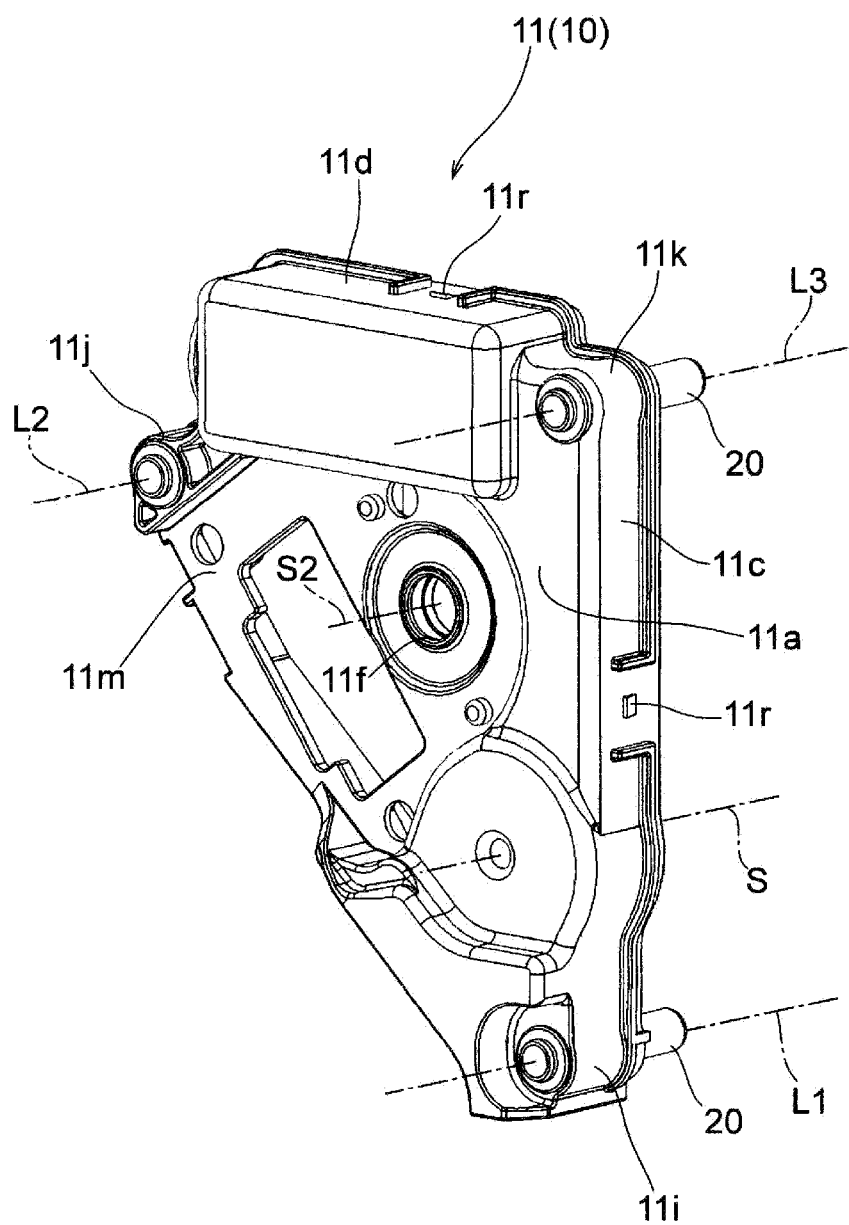
FIG. 6 is a perspective view illustrating the outer side of the housing body shown in FIG. 5.

The housing body 11, as shown in FIGS. 5 and 6, includes a sidewall 11a, a front wall 11b, a back wall 11c, and a top wall 11d defining an accommodation space A.

In addition, the housing body 11 includes a support section 11e, a bearing section 11f, inner wall surfaces 11g and 11h, a lower side boss section 11i and upper side boss sections 11j and 11k as a body boss section, a motor attachment section 11m, a full open stopper 11n, a spring receiving section 11p, a spring receiving section 11q, and four connection claws 11r.

Figure 4:
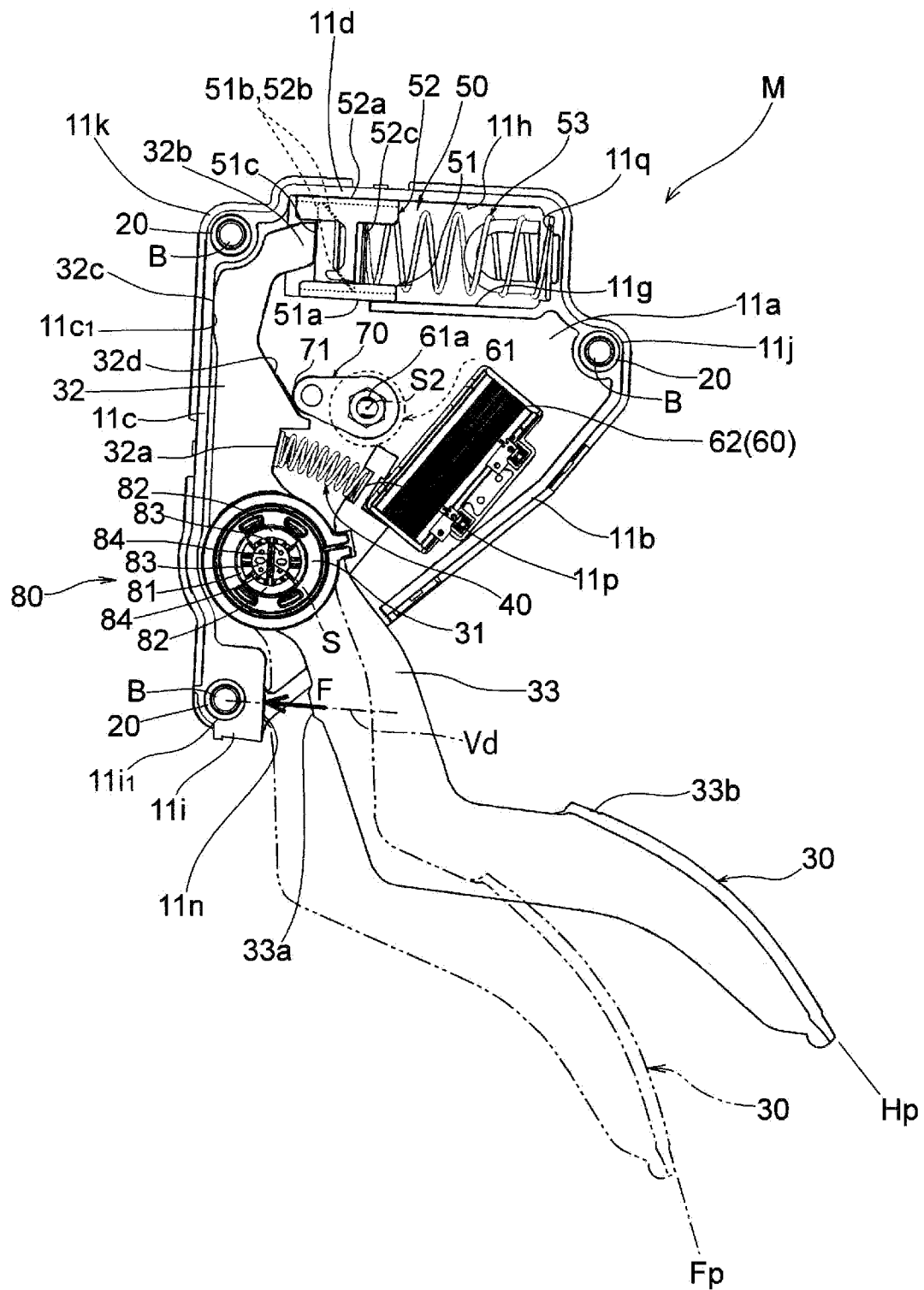
FIG. 4 is a side view illustrating an operation of a pedal arm and the inside of the accelerator pedal device shown in FIG. 3.

As shown in FIG. 4, a portion of a lower region of the front wall 11b is cut out, so that the pedal arm 30 is movable between a rest position Hp and a maximum stepped position Fp. The outer side surface of the back wall 11c is opposite to the vehicle body side fixing wall 2b of the bracket 2, and a portion of the inner side surface of the back wall 11c, as shown in FIG. 4, functions as a rest stopper $11c_1$ specifying the rest position of the pedal arm 30.

The support section 11e is formed to be in a columnar shape with an axial line S being the center, so as to be fit with a fit concave section 31a formed in a cylindrical section 31 of the pedal arm 30 to support the pedal arm 30 to be swivelable about the axial line S.

The bearing section 11f supports a rotation shaft 61a of the lever 70 to be rotatable about an axial line S2 via a bearing.

The inner wall surface 11g supports a slider 51 included in the hysteresis generation mechanism 50 to be slidable.

The inner surface 11h supports the slider 52 included in the hysteresis generation mechanism 50 to be slidable.

The lower side boss section 11i is formed in a substantially rectangular parallelepiped shape with a thickness below the axial line S in the vertical direction and has a through hole $11i_1$ extending in the direction of an axial line L1 parallel to the axial line S.

The through hole $11i_1$ forms a cylindrical hole with the axial line L1 being the center to be fit with the cylindrical collar 20 through which the bolt B passes.

The upper side boss section 11j is formed in a substantially cylindrical shape above the axial line S in the vertical direction and has a through hole $11k_1$ extending in the direction of an axial line L2 parallel to the axial line S.

The through hole $11j_1$ forms a cylindrical hole with the axial line L2 being the center to be fit with the cylindrical collar 20 through which the bolt B passes.

The upper side boss section 11k is formed in a substantially cylindrical shape above the axial line S in the vertical direction and has a through hole $11k_1$ extending in the direction of an axial line L3 parallel to the axial line S.

The through hole $11k_1$ forms a cylindrical hole with the axial line L3 being the center to be fit with the cylindrical collar 20 through which the bolt B passes.

Here, the lower side boss section 11*i* and the upper side boss sections 11*j* and 11*k* are provided at the positions of the respective vertexes of the housing body 11 forming a substantially reversed triangle.

Figure 9:
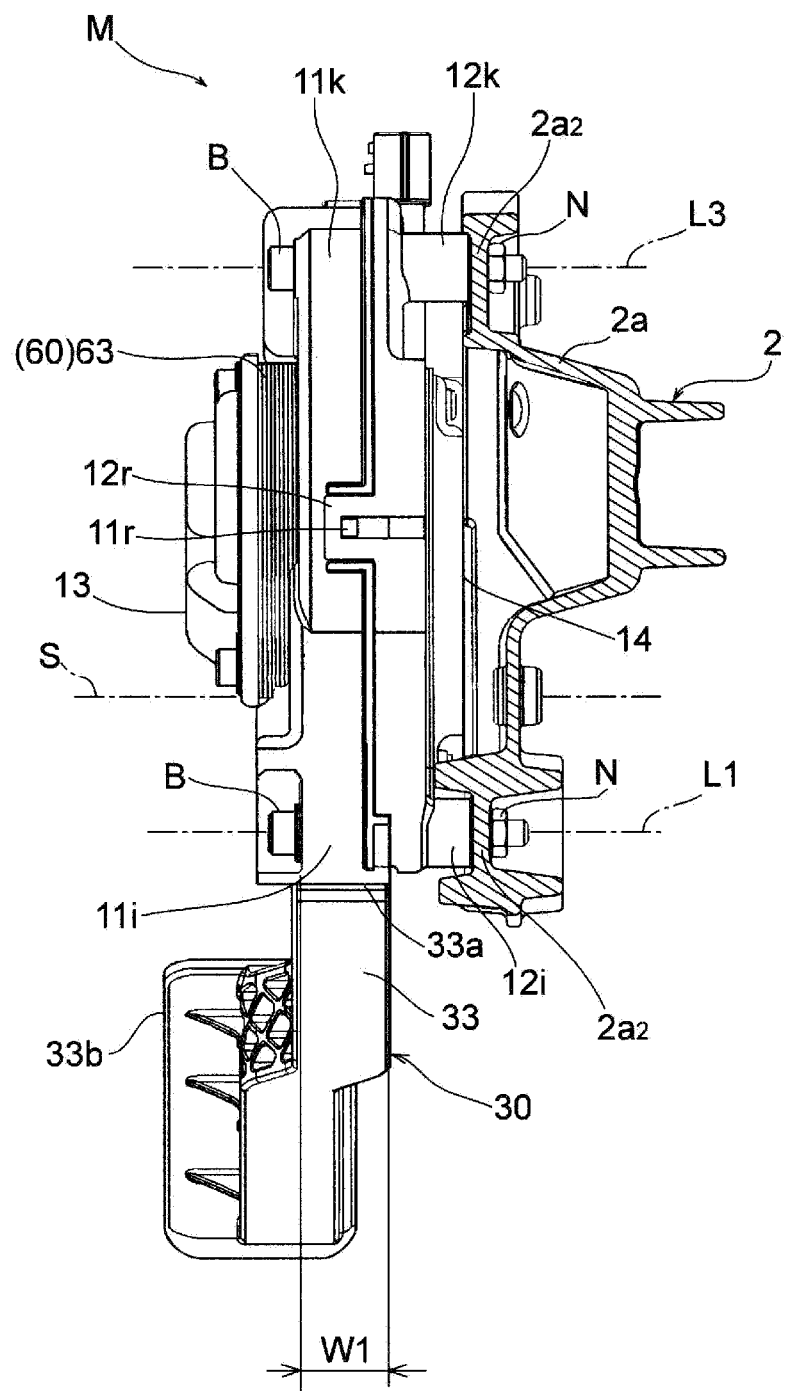
FIG. 9 is a rear view illustrating that the bracket is partially cut off and viewed from the back side of the vehicle body side in the bracket and the accelerator pedal device shown in FIG. 1.

The full open stopper 11*n* receives a contact section 33*a* of the pedal arm 33 to specify the maximum stepping position F of the pedal arm 30, and forms a flat surface parallel to the axial line L1 in the vicinity of the lower side boss section 11*i*, as shown in FIGS. 4 and 5. Here, the full open stopper 11*n*, as shown in FIG. 4, is formed at a position overlapping with the through hole $11i_1$ in a direction Vd receiving a stepping force load F of the pedal arm 30. In addition, as shown in FIG. 9, the full open stopper 11*n* is not offset from the lower side boss section 11*i* in the direction of the axial line L1, and is formed to be slightly less than a width dimension W1 within the range of the width dimension W1 of the lower side boss section 11*i* in the direction of S.

Accordingly, the stepping force load F applied to the full open stopper 11*n* can be prevented from being directly received by the bolt B and the cylindrical collar 20 fit with the lower side boss section 11*i* via the lower side boss section 11*i*.

That is, since the stepping force load F is not applied to a position offset from the lower side boss section 11*i*, there is no load which generates a bending moment, with the lower side boss section 11*i* as a fulcrum, on the housing body 11, and the housing body 11 can be prevented from being deformed or broken.

Still, if a central region receiving the stepping force load F is at a position overlapping with the through hole $11i_1$, the full open stopper 11*n* may also be disposed to be properly offset with respect to the through hole $11i_1$ in the upper-lower direction.

Figure 3:
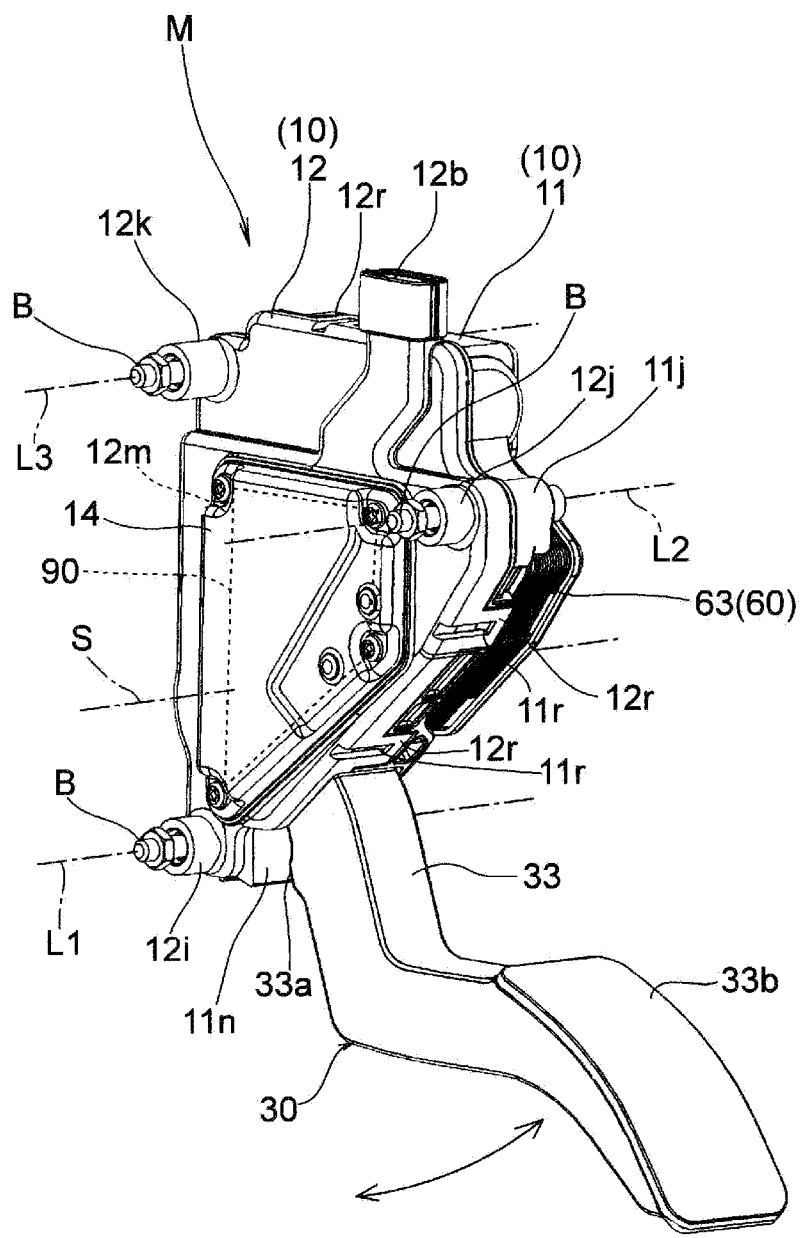
FIG. 3 is a perspective view illustrating the accelerator pedal device shown in FIG. 1.
Figure 7:
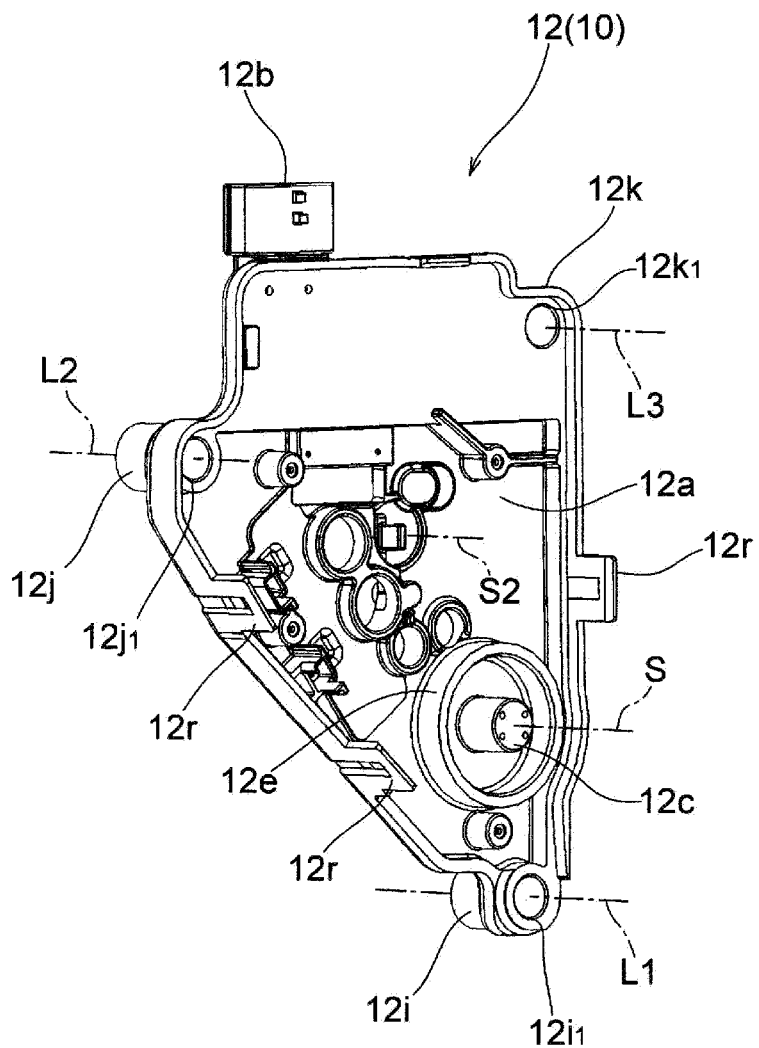
FIG. 7 is a perspective view illustrating the inner side of a housing cover forming a portion of a housing included in the accelerator pedal device shown in FIG. 3.

The housing cover 12 is combined with the housing body 11 to block the accommodation space A of the housing body 11. As shown in FIGS. 3 and 7, the housing cover 12 includes a sidewall 12*a*, a connector 12*b*, a sensor embedded section 12*c*, a support section 12*e*, a lower side boss section 12*i* and an upper side boss section 12*j* as a cover boss section, a substrate attachment section 12*m*, and four connection pieces 12*r*.

The connector 12*b* accommodates terminals extending from the circuit substrate 90 and is connected with an external connector.

A stator 83 and a Hall element 84 forming a portion of the position sensor 80 are embedded in the sensor embedded section 12*c*. In addition, the sensor embedded section 12*c* is formed in a columnar shape with the axial line S being the center, so as to be arranged in a non-contact manner with the inner side of the cylindrical section 31 of the pedal arm 30.

Figure 8:
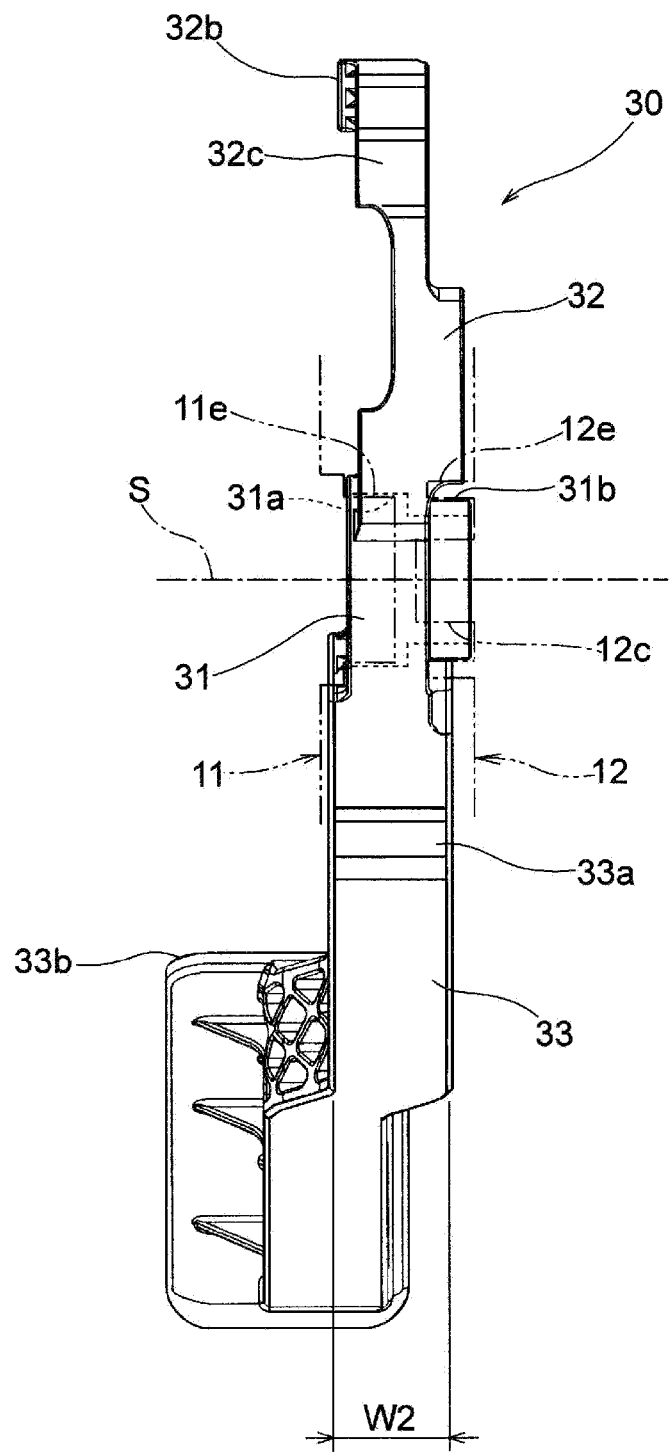
FIG. 8 is a rear view illustrating a pedal arm included in the accelerator pedal device shown in FIG. 3 when viewed from the back side.

As shown in FIG. 8, the support section 12*e* forms a cylindrical shape with the axial line S being the center, so as to be fit with a fit convex section 31*b* formed in the cylindrical section 31 of the pedal arm 30 to support the pedal arm 30 to be swivelable about the axial line S.

The lower side boss section 12*i* is bonded to the lower side boss section 11*i* and formed in a substantially cylindrical shape below the axial line S in the vertical direction, and has a through hole $12i_1$ extending in the direction of the axial line L1 parallel to the axial line S. In addition, the lower side boss section 12*i* is formed to protrude in parallel with the axial line L1 from the outer wall surface of the housing cover 12 to contact the seat section $2a_2$ of the bracket 2.

The through hole $12i_1$ forms a cylindrical hole with the axial line L1 being the center to be fit with the cylindrical collar 20 through which the bolt B passes.

The upper side boss section 12*j* is bonded with the upper side boss section 11*j* and formed in a substantially cylindrical shape above the axial line S in the vertical direction, and has a through hole $12j_1$ extending in the direction of the axial line L2 parallel to the axial line S. In addition, the upper side boss section 12*j* is formed to protrude in parallel with the axial line L2 from the outer wall surface of the housing cover 12 to contact the seat section $2a_2$ of the bracket 2.

The through hole $12j_1$ forms a cylindrical hole with the axial line L2 being the center to be fit with the cylindrical collar 20 through which the bolt B passes.

The upper side boss section 12*k* is bonded with the upper side boss section 11*k* and formed in a substantially cylindrical shape above the axial line S in the vertical direction, and has a through hole $12k_1$ extending in the direction of the axial line L3 parallel to the axial line S. In addition, the upper side boss section 12*k* is formed to protrude in parallel with the axial line L3 from the outer wall surface of the housing cover 12 to contact the seat section $2a_2$ of the bracket 2.

The through hole $12k_1$ forms a cylindrical hole with the axial line L3 being the center to be fit with the cylindrical collar 20 through which the bolt B passes.

In the housing cover 12, the three cylindrical collars 20 fit with the housing body 11 are fit with the respective three through holes $12i_1$, $12j_1$, and $12k_1$ and bonded to the housing body 11, and the connection pieces 12*r* are engaged with the connection claws 11*r*.

Accordingly, the housing 10 in which the housing cover 12 is integrally combined with the housing body 11 is obtained.

The first auxiliary cover 13 is attached to a yoke 63 forming a portion of the torque motor 60 to cover the torque motor 60 attached to the outer side surface of the housing body 11. The second auxiliary cover 14 is attached to the housing cover 12 to cover the circuit substrate 90 attached to the outer side surface of the housing cover 12.

The cylindrical collars 20 are formed by a metal material, and are fit with the through holes $11i_1$, $12i_1$, $11j_1$, $12j_1$, $11k_1$, and $12k_1$ of the boss sections (11*i*, 12*i*, 11*j*, 12*j*, 11*k*, and 12*k*) of the housing body 11 and the housing cover 12 at three places.

Accordingly, since the cylindrical collars 20 are fit with the housing body 11 and the housing cover 12, even though the housing 10 is in a two-part structure, the mechanical strength of the housing 10 can be reinforced.

Accordingly, by using the bolts B and the nuts N, at the regions of the boss sections (11*i*, 12*i*, 11*j*, 12*j*, 11*k*, and 12*k*) at the three places, the housing 10 can be firmly fixed to the bracket 2.

In addition, the boss sections (12*i*, 12*j*, and 12*k*) at the three places are formed to protrude from the outer wall surface of the housing cover 12, so as to contact the housing fixing wall 2*a* of the bracket 2, as shown in FIGS. 1 and 9.

Accordingly, the housing cover 12 can be prevented from interfering with the bracket 2, and the housing 10 can be firmly fixed to the bracket 2 via the boss sections at the three places by using the bolts B and the nuts N.

The pedal arm 30 is formed by a resin material, and, as shown in FIGS. 4 and 8, includes the cylindrical section 31 with the axial line S being the center, an upper side arm 32 extending toward the top in the vertical direction from the cylindrical section 31, and a lower side arm 33 extending toward the bottom in the vertical direction from the cylindrical section 31.

The cylindrical section 31 includes the fit concave section 31a fit with the support section 11e of the housing body 11 and the fit convex section 31b fit with the support section 12e of the housing cover 12.

Also, a pair of arc-shaped permanent magnets 82 combined with the inner circumferential surfaces of annular armatures 81 forming a portion of the position sensor 80 are fixed to the inner circumferential surface of the cylindrical section 31.

The upper side arm 32 includes a spring receiving section 32a receiving an end part of the return spring 40, a contact section 32b contacting the slider 51 of the hysteresis generation mechanism 50, a contact section 32c contacting the rest stopper $11c_1$ at the rest position Hp, and an engagement section 32d engaged with the lever 70.

The lower side arm 33 includes the contact section 33a contacting the full open stopper 11n at the maximum stepped position Fp and an accelerator pedal 33b.

As shown in FIG. 8, the contact section 33a forms a predetermined width W2 in the direction of the axial lines S and L1 and forms a trapezoidal shape extending in parallel with the axial lines S and L1 on the rear surface facing to the full open stopper 11n.

That is, the width dimension W2 of the contact section 33a is slightly smaller than the width dimension W1 of the lower side boss section 11i and formed to be equal to the width dimension of the full open stopper 11n.

In addition, the pedal arm 30 is supported with respect to the housing 10 to be swivelable about the axial line S by fitting the support section 11e to the fitting concave section 31a and fitting the fitting convex section 31b to the support section 12e.

As shown in FIG. 4, the return spring 40 is a compression coil spring formed by spring steel, etc., an end part of the return spring 40 contacts the spring receiving section 11p of the housing body 11, the other end part of the return spring 40 contacts the spring receiving section 32a of the pedal arm 30 to be attached in a state of being compressed with a predetermined compression allowance.

The return spring 40 exerts a biasing force returning the pedal arm 20 to the rest position Hp.

As shown in FIG. 4, the hysteresis generation mechanism 50 includes the slider 51, the slider 52, and a biasing spring 53.

The slider 51 is, for example, formed by a resin material such as a highly slidable material like oil-impregnated polyacetal, and has a contact surface 51a slidably contacting the inner wall surface 11g of the housing 10, an inclined surface 51b contacting an inclined surface 52b of the slider 52, and an engagement surface 51c detachably engaged with a contact section 32b of the upper side arm section 32.

The slider 52 is formed by a resin material, for example, such a highly slidable material such as oil-impregnated polyacetal, and has a contact surface 52a slidably contacting the inner wall surface 11h of the housing 10, the inclined surface 52b contacting the inclined surface 51b of the slider 51, and a receiving surface 52c receiving an end part of the biasing spring 53.

The biasing spring 53, for example, is a compression coil spring formed by spring steel, etc., and is provided in a state where an end part contacts the receiving surface 52c of the slider 52 and the other end part contacts the spring receiving section 11q of the housing 10 to be compressed.

In addition, the biasing spring 53 presses the inclined surface 52b of the slider 52 toward the inclined surface 51b of the slider 51 to exert a wedge effect pressing the sliders 51 and 52 toward the inner wall surfaces 11g and 11q and exerts a biasing force returning the pedal arm 30 to the rest position via the sliders 51 and 52.

In the hysteresis generation mechanism 50, at the time when the accelerator pedal 33b is stepped on, a friction force in a direction against the stepping operation is generated between the sliders 51 and 52 and the housing 10 and increases as the compression amount of the biasing spring 53 increases.

Meanwhile, at the time when the accelerator pedal 33b is returned, the friction force generated between the sliders 51 and 52 and the housing 10 is generated in a direction opposite to the case of the stepping operation and decreases as the compression amount of the biasing spring 52 decreases. Here, since the stepping force of the return operation is smaller than the stepping force of the stepping operation, hysteresis is generated in the stepping force.

Still, during the return operation, at the time when the slider 51 is stuck and stopped, the pedal arm 30 is returned to the rest position by the biasing force of the return spring 40.

The torque motor 60 is disposed in the housing body 11 and includes a rotor 61 having a pair of permanent magnets, a coil 62 for excitation, and a yoke 63 for forming a magnetic path. The rotor 61 has a rotation shaft 61a with an axial line S2 as the center. The rotation shaft 61a is supported to be rotatable about the axial line S2 via a bearing in the bearing section 11f of the housing 11.

The coil 62 is wound about a bobbin held to a portion of the yoke 63. By supplying power, a magnetic field line is generated on the magnetic path of the yoke 63.

The yoke 63 is formed to face the rotor 61 in a gap, and is fixed to the motor attachment section 11m of the housing body 11.

The first auxiliary cover 13 is attached to the yoke 63 to cover the torque motor 60 from the outer side in the direction of the axial line S2.

As shown in FIG. 4, the lever 70 is fixed to the rotation shaft 61a of the rotor 61 and integrally rotates with the rotor 61 about the axial line S2. A roller 71 located at the tip is engaged with the engagement section 32d of the pedal arm 30.

In addition, at the time when the torque motor 60 does not exert a drive force, the lever 70 functions to follow the swiveling of the pedal arm 30 by a detent torque. At the time when the torque motor 60 exerts a drive force, the lever 70 functions to resist the stepping force to push the pedal arm 30 back to the rest position Hp or suppress the stepping.

The position sensor 80 is a non-contact magnetic sensor. As shown in FIG. 4, the position sensor 80 includes the annular armatures 81 consisting of a magnetic material and fixed to the inner circumferential surface of the cylindrical section 31 of the pedal arm 30, the pair of permanent magnets 82 in an arc shape fixed to the inner circumferential surface of the armatures 81, and two stators 83 and two Hall elements 84 consisting of a magnetic material and embedded in the sensor embedded section 12c of the housing cover 12.

In the position sensor 80, the armatures 81 and the permanent magnets 82 rotate relative to the stators 83 and the Hall elements 84 through rotation of the pedal arm 30, and the Hall elements 84 detect the magnetic flux density changes to output voltage signals, thereby detecting the angular position of the pedal arm 30.

The circuit substrate 90 includes a control circuit which includes various electronic components, a circuit which processes signals output from the Hall elements 84, terminals electrically connected to the Hall elements 84, and other electronic components.

In addition, as shown in FIG. 3, the circuit substrate 90 is attached to the substrate attachment section 12m of the housing cover 12, and the second auxiliary cover 14 is attached to the housing cover 12 to cover the circuit substrate 90 from the outer side thereof.

In the following, the operation of the accelerator pedal device M is described. First of all, at the time when the driver does not step on the accelerator pedal 33b, due to the biasing force of the return spring 40, the contact section 32c of the upper side arm 32 contacts the rest stopper $11c_1$ of the housing 10 to stop the pedal arm 30 at the rest position Hp.

When the driver steps on the accelerator pedal 33b from this state, the pedal arm 30, on the one hand resists the biasing force of the return spring 40, on the other hand rotates until the maximum stepped position Fp (full open position) while increasing the resistant load which the hysteresis generation mechanism 50 generates, and the contact section 33a of the lower side arm 33 contacts the full open stopper 11n of the housing 10 and stops.

Meanwhile, when the driver loosens the stepping force, while applying a resistant load smaller than the resistant load at the time of stepping to the driver, the pedal arm 30 is moved toward the rest position Hp by the urging force of the return spring 40, and the contact section 32c of the upper side arm 32 contacts the rest stopper $11c_1$ of the housing 10 and stops. In the return operation, the lever 70 contacts and follows the engagement section 32d of the upper side arm 32.

Still, in the state where the driver steps on the accelerator pedal 33b, in the case where it is determined as necessary to suppress the stepping operation, the reaction force adding mechanism (60, 70) is activated and controlled to resist the stepping force of the driver to push the pedal arm 30 back to the rest position Hp or suppress the stepping.

In the case where the driver steps on the accelerator pedal 33b with an excessive stepping force, the stepping force load F is applied to the full open stopper 11n via the contact section 33a.

Here, the stepping force load F applied to the full open stopper 11n can be prevented from being directly received by the bolt B and the cylindrical collar 20 fit with the lower side boss section 11i via the lower side boss section 11i.

That is, since the stepping force load F is not applied to a position offset from the lower side boss section 11i, there is no load which generates a bending moment, with the lower side boss section 11i as a fulcrum, in a vertical plane perpendicular to the axial line L1 with respect to the housing body 11, and the housing body 11 can be prevented from being deformed or broken.

Meanwhile, via the fitting relationship between the support sections 11e and 12e and the cylindrical section 31, on the side above the lower side boss section 11i in the vertical direction, a bending moment which deforms the housing 10 toward the driver side is generated. Here, the two upper side boss sections 11j, 12j, 11k, and 12k are provided above the axial line S in the vertical direction, and the housing 10 is firmly fixed to the bracket 2 by the bolts B and the nuts N in the two upper side boss sections 11j, 12j, 11k, and 12k. Therefore, the housing 10 can resist such bending moment, and can be prevented from being deformed or broken. Therefore, the pedal arm 30 can operate properly.

In addition, since the full open stopper 11n is formed within the range of the width dimension W1 of the lower side boss section 11i, the stepping force load F applied to the full open stopper 11i is not applied to a position offset from the lower side boss section 11i in the direction of the axial line L1.

Therefore, there is no load which generates a bending moment, with the lower side boss section 11i as a fulcrum, within a plane including the axial line L1 with respect to the housing body 11, and the housing body 11 can be prevented from being deformed or broken.

Moreover, since the cylindrical collars 20 are fit with the housing body 11 and the housing cover 12, the mechanical strength of the housing 10 forming a two-part structure is increased, and the attachment rigidity of the housing 10 with respect to the bracket 2 can be increased.

Figure 10:
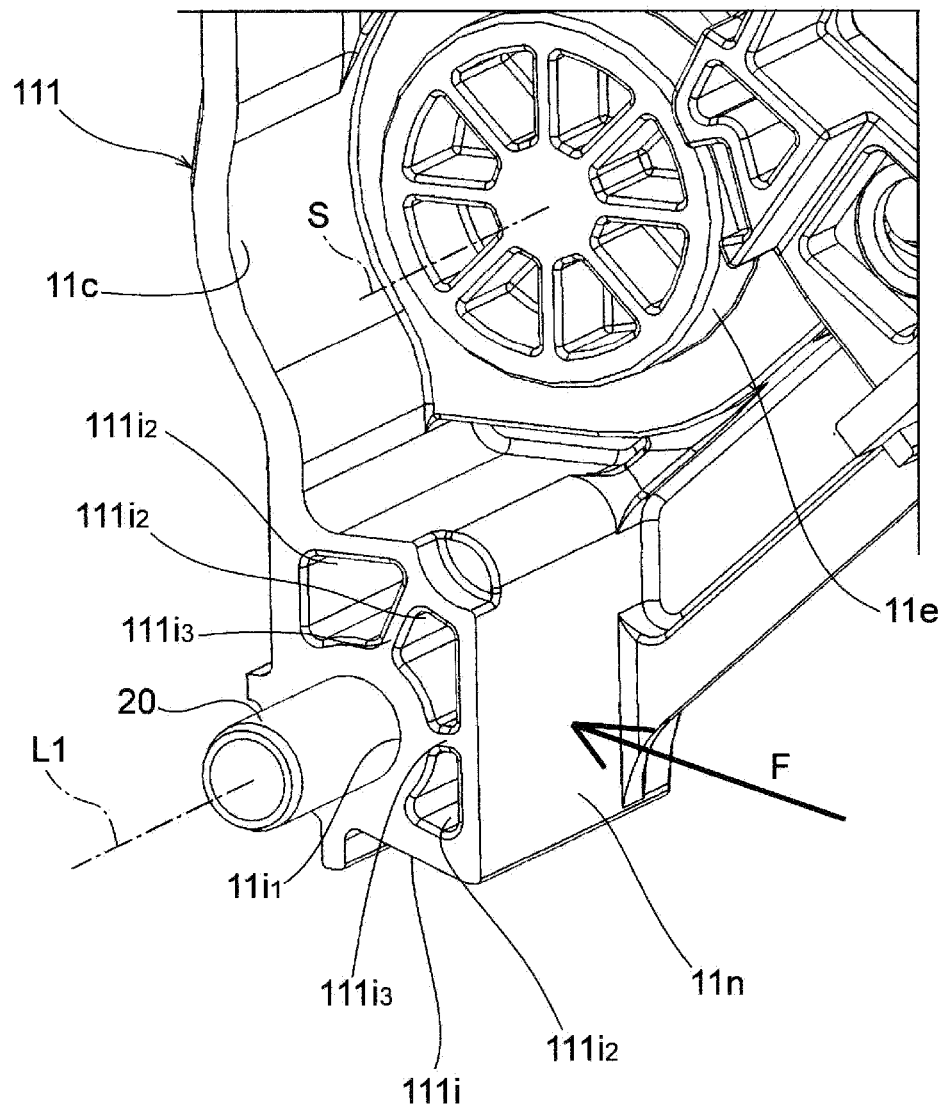
FIG. 10 is a partial perspective view illustrating another embodiment of a boss section in the accelerator pedal device according to the invention.

FIG. 10 illustrates another embodiment of the lower side boss section 11i in the housing body 11. The remaining structure is the same as the structure of the above embodiment.

A housing body 111 according to the embodiment includes the sidewall 11a, the front wall 11b, the back wall 11c, and the top wall 11d defining the accommodation space A.

In addition, the housing body 111 includes the support section 11e, the bearing section 11f, the inner wall surfaces 11g and 11h, a lower side boss section 111i and the upper side boss section 11j as the body boss section, the motor attachment section 11m, the full open stopper 11n, the spring receiving section 11p, the spring receiving section 11q, and the four connection claws 11r.

The lower side boss section 111i is formed to exhibit an outer profile in a substantially rectangular parallelepiped shape below the axial line S in the vertical direction, and includes the through hole $111i_1$ extending in the direction of the axial line L1 parallel to the axial line S, multiple thinned concave sections $111i_2$ on the periphery of the through hole $11i_1$, and a reinforcing rib $111i_3$ interposed between the thinned concave sections $111i_2$.

The reinforcing rib $111i_3$ functions to transmit the stepping force load F applied to the full open stopper 11n to the cylindrical collar 20 and the bolt B passing through the lower side boss section 111i.

Accordingly, by providing the thinned concave sections $111i_2$, the weight of the housing 111 can be reduced, and by providing the reinforcing rib $111i_3$, the stepping force load F applied to the full open stopper 11n can be prevented from being directly received by the cylindrical collar 20 and the bolt B fit with the lower side boss section 111i.

That is, since the stepping force load F is not applied to a position offset from the lower side boss section 111i, there is no load which generates a bending moment, with the lower side boss section 111i as a fulcrum, in a vertical plane perpendicular to the axial line L1 |with respect to the housing body 111, and the housing body 111 can be prevented from being deformed or broken.

In addition, since the full open stopper 11n is formed within the range of the width dimension W1 of the lower side boss section 111i, the stepping force load F applied to the full open stopper 11n is not applied to a position offset from the lower side boss section 111i in the direction of the axial line L1.

Therefore, there is no load which generates a bending moment, with the lower side boss section 111i as a fulcrum, within a plane including the axial line L1 with respect to the housing body 111, and the housing body 111 can be prevented from being deformed or broken.

Moreover, since the cylindrical collars 20 are fit with the housing body 111 and the housing cover 12, the mechanical strength of the housing 10 forming a two-part structure is increased, and the attachment rigidity of the housing 10 with respect to the bracket 2 can be increased.

In the embodiment, since the accelerator pedal device M is fixed to the dash lower panel 1 of the vehicle body via the bracket 2, by applying various brackets 2 corresponding to vehicle types, the accelerator pedal device M can be applied to various vehicles without changing the boss sections of the housing 10.

While a configuration including the reaction force adding mechanism (60, 70) is shown in the above embodiments, the invention is not limited thereto. The invention may also be adopted for a configuration in which the reaction force adding mechanism is omitted.

While the case where the accelerator pedal device M is fixed to the vehicle body via the bracket 2 is shown in the above embodiments, the invention is not limited thereto. The invention may also be adopted for a configuration in which the housing 10 of the accelerator pedal device M is directly fixed to the vehicle body.

While a configuration using the pedal arm 30 in which a pedal arm integrally includes the accelerator pedal 33*b* is shown in the above embodiments, the invention is not limited thereto. The invention may also be adopted for a configuration in which the accelerator pedal and the pedal arm are formed separately, and the pedal arm is operatively associated with the accelerator pedal supported on a floor surface of a vehicle, etc., to be swivelable.

While the case where the housing 10 is configured by the housing body 11, 111, and the housing cover 12 is shown in the above embodiments, the invention is not limited thereto.

The invention may also be adopted in an integrally formed housing.

INDUSTRIAL APPLICABILITY

According to the above, the accelerator pedal device of the invention is capable of preventing the housing from being deformed or broken while simplifying the structure as well as the shape and reducing the cost as well as the size. Therefore, in addition to being applicable to automobiles, the accelerator pedal device is also useful in other vehicles.

What is claimed is:

1. An accelerator pedal device, comprising:
   a pedal arm, having an accelerator pedal;
   a resin housing, supporting the pedal arm to be swivelable about a predetermined axial line between a rest position and a maximum stepping position; and
   a return spring, applying a biasing force for returning the pedal arm to the rest position,
   wherein the housing comprises a boss section through which a bolt for fixing the housing to a vehicle body passes and a full open stopper specifying the maximum stepping position in a vicinity of the boss section,
   the boss section has a through hole extending in parallel with the axial line, and
   the full open stopper is formed at a position overlapping and in line with the through hole in a direction of receiving a stepping force load of the pedal arm.

2. The accelerator pedal device as claimed in claim 1, wherein the boss section comprises, on a periphery of the through hole, a plurality of concave sections and a reinforcing rib interposed between the concave sections to transmit the stepping force load applied to the full open stopper to the bolt passing through the boss section.

3. The accelerator pedal device as claimed in claim 1, wherein the full open stopper is formed within a range of a width dimension of the boss section in a direction of the axial line.

4. The accelerator pedal device as claimed in claim 1, wherein the boss section is fit with a cylindrical metal collar for the bolt to pass through.

5. The accelerator pedal device as claimed in claim 1, wherein the pedal arm comprises a cylindrical section supported on the housing, an upper side arm extending upward in a vertical direction from the cylindrical section, and a lower side arm extending downward in the vertical direction from the cylindrical section, and
   the lower side arm has a contact section forming a predetermined width in a direction of the axial line and contacting the full open stopper on a rear surface facing to the full open stopper.

6. The accelerator pedal device as claimed in claim 1, wherein the boss section comprises a lower side boss section disposed below the axial line in a vertical direction and a plurality of upper side boss sections disposed above the axial line in the vertical direction, and
   the full open stopper is provided in a vicinity of the lower side boss section.

7. The accelerator pedal device as claimed in claim 1, wherein the housing comprises a housing body defining an accommodation space accommodating a cylindrical section and an upper side arm of the pedal arm and a housing cover combined with the housing body to block the accommodation space,
   the boss section comprises a body boss section provided in the housing body and a cover boss section provided in the housing cover, and
   the full open stopper is provided in a vicinity of the body boss section.

8. The accelerator pedal device as claimed in claim 1, wherein the housing is fixed with respect to the vehicle body via a bracket.

9. The accelerator pedal device as claimed in claim 8, wherein the bracket comprises a housing fixing wall to which the housing is fixed and a vehicle body side fixing wall to be fixed to the vehicle body.

10. The accelerator pedal device as claimed in claim 9, wherein the boss section is formed to protrude in parallel with the axial line from an outer wall surface of the housing to contact the housing fixing wall.

* * * * *